United States Patent [19]

Hoff

[11] Patent Number: 4,560,176

[45] Date of Patent: Dec. 24, 1985

[54] INVERTED CONE STUFFING BOX

[75] Inventor: H. Milton Hoff, Borger, Tex.

[73] Assignee: J. M. Huber Corporation, Locust, N.J.

[21] Appl. No.: 517,484

[22] Filed: Jul. 26, 1983

[51] Int. Cl.$^4$ ............................................. F16J 15/24
[52] U.S. Cl. ................................... 277/105; 277/115; 277/118; 277/124
[58] Field of Search ............... 277/105, 106, 115, 116, 277/116.2, 117–125

[56] References Cited

U.S. PATENT DOCUMENTS

| | | | |
|---|---|---|---|
| 712,512 | 11/1902 | Elliott | 277/116 |
| 1,044,787 | 11/1912 | Klingloff | 277/124 X |
| 2,278,347 | 3/1942 | Cope | 277/124 |
| 2,765,185 | 10/1956 | Mott | 277/124 |
| 2,789,846 | 4/1957 | Moseley . | |
| 2,833,572 | 5/1958 | Moseley . | |
| 2,994,549 | 8/1961 | Tschappat . | |
| 3,002,776 | 10/1961 | Tschappat | 277/235 |
| 3,013,830 | 12/1961 | Milligan | 277/124 X |
| 3,013,831 | 12/1961 | Tschappat . | |
| 3,050,312 | 8/1962 | Tschappat | 277/208 |
| 3,084,946 | 4/1963 | Sharp | 277/124 X |
| 3,351,350 | 11/1967 | Shepler | 277/124 X |
| 4,192,517 | 3/1980 | Torres | 277/118 X |
| 4,234,197 | 11/1980 | Amancharla et al. | 277/125 X |
| 4,406,469 | 9/1983 | Allison | 277/123 |

FOREIGN PATENT DOCUMENTS

| | | | |
|---|---|---|---|
| 2412698 | 9/1975 | Fed. Rep. of Germany | 277/124 |
| 402081 | 1/1912 | France | 277/117 |

Primary Examiner—Robert S. Ward
Attorney, Agent, or Firm—Harold H. Flanders; Alec H. Horn; Robert M. Carwell

[57] ABSTRACT

A stuffing box for use in oil and gas wells having improved sealing. A plurality of ring-like packing glands each has an outer surface defining an inverted frustoconical shape and a bore therethrough also defining an internal inverted frusto-conical surface whereby the glands nest upon one another in cup-like fashion. A ring-like seal seat also has a bore forming an inverted frustco-conical inner surface which, in assembly, carries the nested glands. The inner wall of a stuffing box body defines a cavity which contains the assembly, the seat thereof being carried by a lower shoulder portion defined by the body. A cylindrical gland cap has a lower gland follower edge portion which exerts downward pressure on the end of the uppermost gland. The vertical bore through the body, seat, glands, and gland cap is adapted to receive a vertical reciprocating polished rod in coaxial alignment therewith whereby the downward pressure of the gland follower effects sealing of the inner and outer surfaces of the glands to the rod and to the inner wall of the body, respectively. Sealing is pressure-enhanced by borehole pressure, and any misalignment of the rod is compensated for by providing for horizontal movement of the seat, glands, and gland cap relative to the box.

29 Claims, 5 Drawing Figures

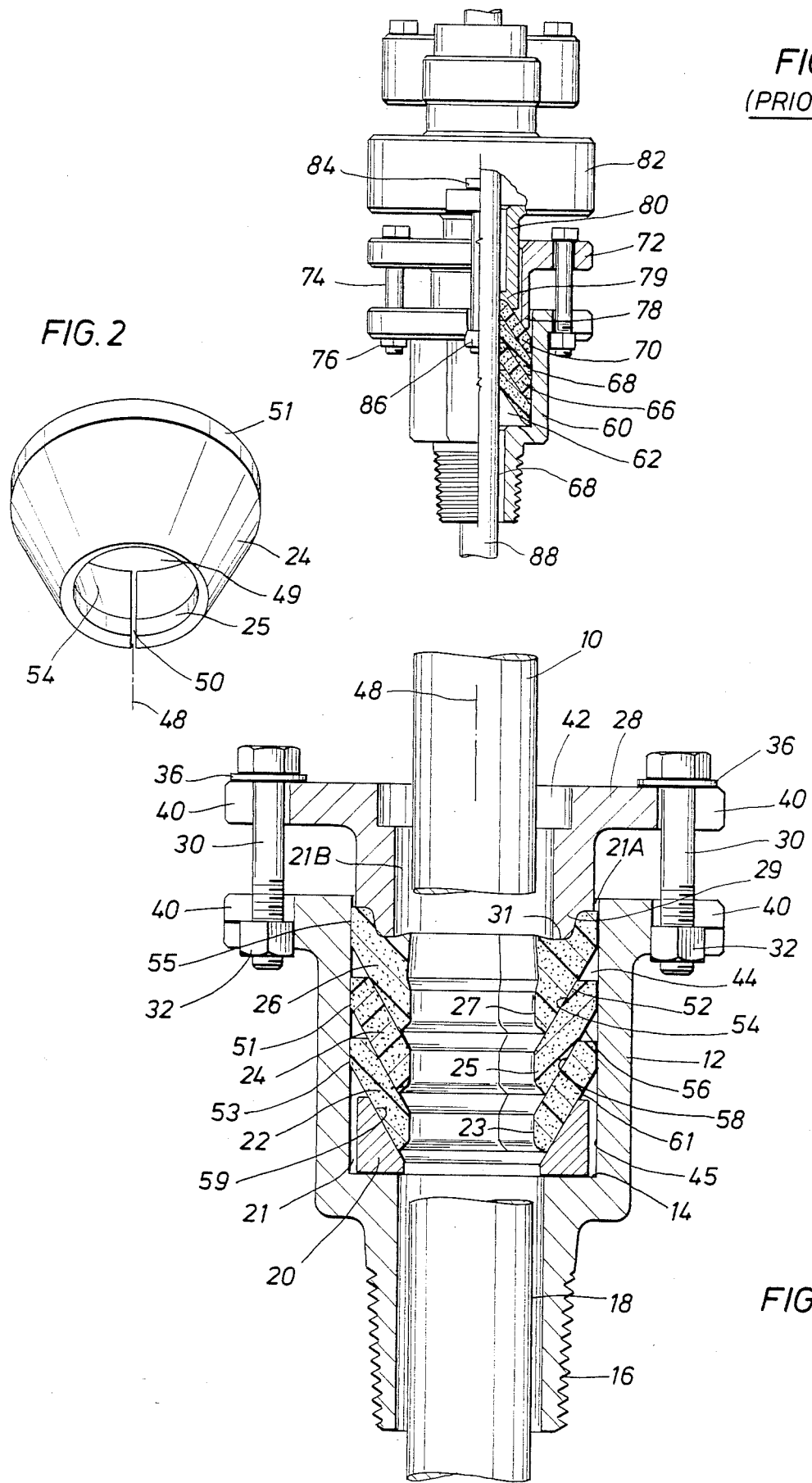

INVERTED CONE STUFFING BOX

BACKGROUND OF THE INVENTION

This invention relates to improvements in stuffing boxes, and more particularly, to a novel conical packing gland assembly for utilization with polished rod stuffing boxes for oil and gas wells and the like.

Many producing wells today do not have sufficient subsurface pressure to lift fluids from the formation by a natural flow process. Thus, many of the wells are produced by means of reciprocating-type bottom hole pumps. The pump is usually actuated by a string of sucker rods which extend longitudinally downward through the tubing string into the well bore. The uppermost rod is called a polished rod and usually reciprocates within a stuffing box which is secured to the well head. A plurality of resilient packing gland members are disposed within the stuffing box around the polished rod for providing a seal between the box and the rod, thereby preventing pressurized borehole fluids from leaking around the rod and out the box which cause pollution problems and the like around the wellsite.

It was learned from field experience that packing glands having a generally conical shape were usually the most desirable in operation and accordingly received wide acceptance in the industry. Examples of such glands and their use in stuffing boxes may be found in U.S. Pat. Nos. 2,833,572 to Moseley, and 2,994,549; 3,002,776; 3,013,831; and 3,050,312, all to Tschappat. Nevertheless, several serious problems were associated with such glands as they were employed in the conventional stuffing box designs of the prior art.

Well head pressures at the stuffing box may, in some cases, be in the relatively low range of 40 pounds per square inch, which, nevertheless, would result in leakage out of the stuffing box due to normal wear about the seal, sometimes even after a relatively brief period of use.

However, several factors would frequently cause pressures to increase to as much as 1,000 or 2,000 psi, greatly increasing the problems encountered in effecting a good seal about the rod.

For example, as the search for subsurface petroleum reserves became more competitive, this lead to production from deeper wells wherein higher wellhead pressures were required to effect production.

Moreover, production in low temperatures results in oil of a relatively high viscosity also requiring greatly increased wellhead pressures for such production. These low temperature conditions may result from production during winter months or from production in more remote, colder climates, which is also becoming more commonplace as competition for petroleum reserves becomes more keen.

Still further, relatively high viscosities may also result from many crudes having a low API gravity (in the range of, say 8°–18°) even at normal temperatures, such as 70° F., also requiring the aforementioned attendant increases in wellhead pressures necessary for production.

Yet another factor contributing to greatly increased pressures which must be handled by the stuffing box seals is the use of relatively long flow lines employed between the wellhead and the tank battery. Pressures due to these long lines may, of course, be increased even further during the aforementioned low temperature situations due to exposure of the flowline to the environment. These higher pressures, in turn, also contribute to the aforementioned leakage problems.

Several solutions to the hereinbefore noted problems were attempted. One such attempt was to provide for manual maintenance procedures for the conventional stuffing boxes whereby seals were periodically tightened about the rod. Not only was this procedure time consuming and costly, but it required tightening within a range which was often difficult to determine in the field—too much tightening resulted in overheating of packing glands and excessive wear on and damage to the glands, whereas if the seals were not tightened enough, leakage would soon reoccur. Yet another attempted solution when the leakage became excessive, was to "repack" the box, e.g., suspend production while seals were replaced in their entirety—again, a highly costly and undesirable procedure which, in extreme conditions, might even have to be done on a daily basis.

Still a further attempted solution was to provide for larger and more numerous seals, often resulting in stuffing boxes containing four large, thick packing glands. One serious difficulty with this approach was that modern petroleum production often results in concomitant production of highly corrosive substances such as hydrogen sulfide. Whereas exotic polymer materials were available capable of withstanding this harsh chemical environment from which packing glands could be fashioned, these materials are quite expensive. Accordingly, due to the volume of material required by this proposed solution to adequate effect a seal, less costly and thus less corrosion-resistant materials were utilized, resulting ultimately in return of the leakage problems.

Even if such corrosion-resistant materials were employed, yet an additional difficulty was encountered in providing larger, more numerous, and thus bulkier seals, namely the lack of space on the wellhead. Often stuffing boxes are installed on wells which have been in production for a long period. As technology has improved and environmental and safety concerns have come to the fore, many older wells are being upgraded with additional equipment, such as blowout preventers and pollution control devices. The total available cumulative height of all wellhead equipment including these devices, e.g., the "christmas tree", is often limited by the earlier positioning of the pumping platform. For this reason, the overall height or profile of a stuffing box is of critical concern to producers, with height differentials of even one inch dissuading or preventing a producer from utilizing an additional add-on to the christmas tree.

Therefore, it is a disadvantage of conventional stuffing boxes that, due to the aforementioned large multiple packing gland members and the large gland caps associated therewith to be hereinafter described, their height often exceeds the range tolerated by a particular platform.

Yet another problem with the prior art was that machining to close tolerances was required for the gland follower elements which provided downward sealing force against the glands to prevent damage to them. Still a further problem associated with the prior stuffing box designs was that the high pressures from the borehole had a tendency to open up the packing glands thereby contributing to the sealing problems.

One further problem with stuffing boxes of the prior art was associated with the fact that at times the polished rod, for various reasons, would become vertically misaligned with respect to the box, resulting in excessive wear and leakage about the packing glands. In the past, this required, in extreme cases, dismantling of the christmas tree and re-plumbing of the rod. It was thus highly desirable to provide a means for substantially reducing or eliminating the problems arising from this misalignment.

The disadvantages of the prior art are overcome by the present invention and an improved apparatus is provided for establishing a fluid-tight seal around a reciprocating polished rod in a stuffing box.

SUMMARY OF THE INVENTION

A stuffing box body includes an inner wall defining a cylindrical cavity having a central vertical axis therethrough. The cavity is adapted to receive in coaxial alignment therewith a polished rod. The body forms a horizontal shoulder at the bottom of the cavity which carries a gland seat of a metallic or engineered plastic composition disposed internally of the body and aligned coaxially relative to the rod and cavity. The seat has a ring-like configuration having an outside diameter smaller than the inside diameter of the cavity to permit the seat to move laterally within the cavity relative to the vertical axis thus effecting concentric alignment with the rod.

A plurality of packing glands comprised of a resilient sealing material such as a polymer compound are disposed within the cavity also in coaxial alignment therewith. Each gland is of a ring-like inverted frusto-conical configuration having a conical bore therethrough whereby the inner and outer surfaces thereof extend generally upward and outward when disposed within the cavity. The inner surface of the seat also forms an inverted frusto-conical surface whereby, in assembly, each gland matingly nests partially within the adjacent lower gland and the lowermost gland, in turn, nests partially within the seat.

A gland cap is provided having a generally cylindrical lower gland follower portion disposed within the cavity adjacent the wall and in coaxial alignment therewith. The gland follower is in mating engagement with the top edge of the uppermost gland about its periphery. A plurality of nuts and bolts interconnect the gland cap and the stuffing box body whereby when the bolts are tightened, the gland follower is forced downward within the cavity against the uppermost gland edge. In the alternative the outer periphery of the cap and a portion of the body may be matingly threaded so as to effect this downward force. The glands and seat are adapted to be disposed coaxially with and about the rod, whereby when the gland follower is thus forced downward, the inner and outer surfaces of each gland are forced into sealing engagement with the surface of the rod and the inner surface of the body wall, respectively.

Inasmuch as the walls of the glands extend in a generally upward and outward direction and the gland follower prevents upward movement of the outer portions of the glands, upward borehole pressure along the rod surface and within the portion of the cavity below the glands will tend to force the portion of the glands immediately adjacent the rod surface radially inward against the rod, thereby effecting pressure-enhanced sealing. Moreover, due to the outer diameter of the seat and gland cap being smaller than the cavity inner diameter, lateral movement of the seat glands and gland cap relative to the body is thereby permitted, thus compensating for vertical misalignment of the rod relative to the stuffing box and reducing wear on the glands.

Accordingly, it is a feature of the present invention to provide a stuffing box capable of withstanding higher pressures without significant leaking around the polished rod.

It is another feature of the present invention to provide a stuffing box having pressure enhanced sealing.

It is yet another feature of the present invention to provide a stuffing box in which packing glands have a longer useful lifetime.

It is still another feature of the present invention to provide a stuffing box which has a reduced size.

It is a further feature of the present invention to reduce the volume of packing material necessary in a stuffing box to provide adequate sealing.

It is another feature of the present invention to provide a stuffing box which compensates for misalignment of the polished rod relative to the body of the box thereby improving sealing and lifetime of the packing glands.

It is yet another feature of the present invention to provide a novel stuffing box subcombination assembly to permit conversion of a prior art stuffing box into a stuffing box of the present invention.

These and other features of the present invention will become apparent from the following detailed description wherein reference is made to the accompanying drawings.

IN THE DRAWINGS

FIG. 1 is an elevational view, partially in section, of a stuffing box of the present invention.

FIG. 2 is a pictorial illustration of a typical packing gland member used in a stuffing box of the present invention.

FIG. 3 is an elevational view, partially in section, of a prior art stuffing box.

DETAILED DESCRIPTION

Figure 4:
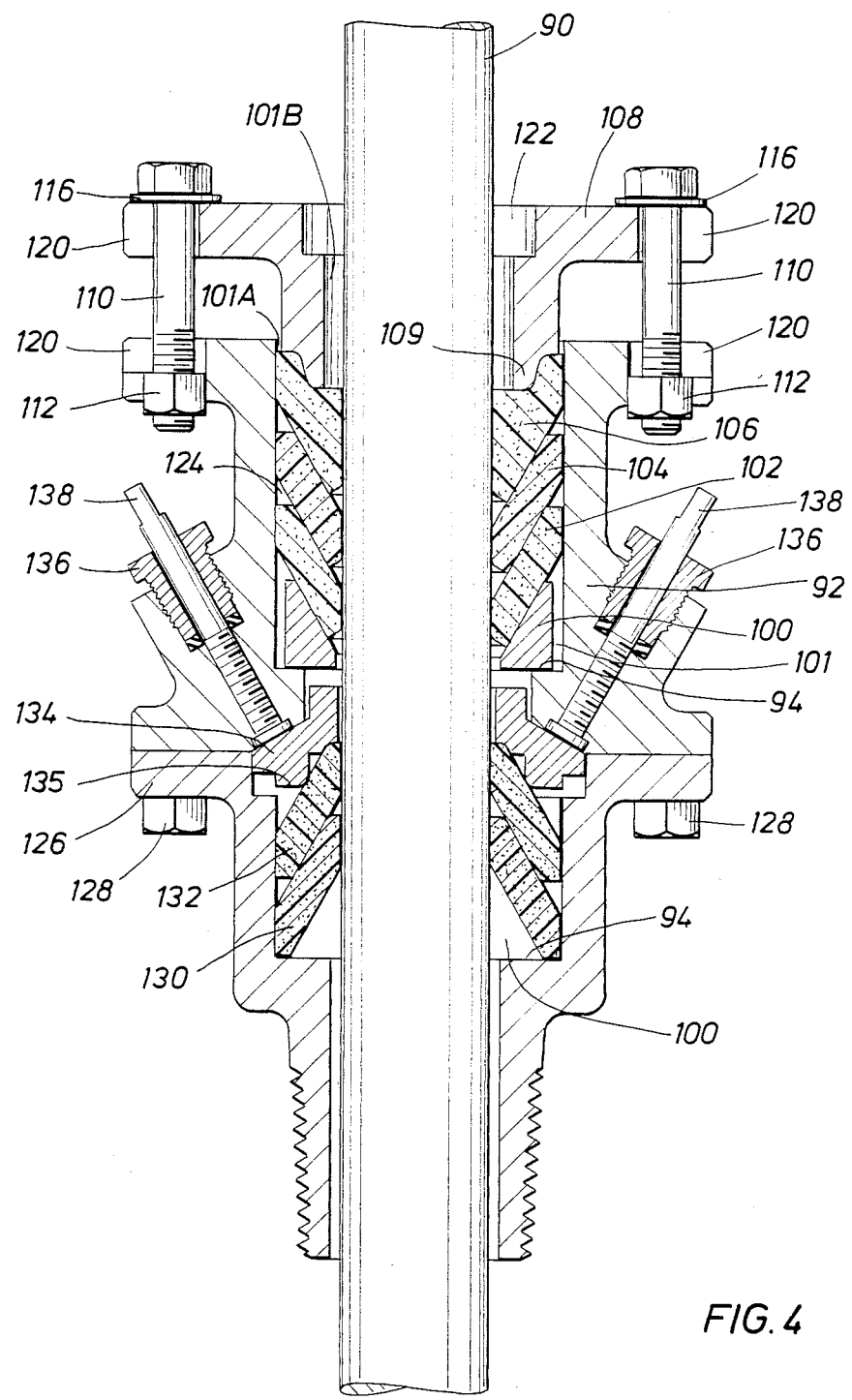
FIG. 4 is an elevational view, partially in section, of another embodiment of the stuffing box of the present invention.

Referring now to FIGS. 1 and 4, there may be seen depicted therein views of an embodiment of a stuffing box of the present invention having a stuffing box body 12 loosely disposed around polished rod 10. The body 12 is provided with a downwardly extending exteriorly threaded neck 16 portion adapted for connection to a well head (not shown) at the surface of an oil well bore. The neck 16 is provided with a cylindrical internal bore 18 for loosely receiving rod 10 as shown in FIG. 1. The bore 18 extends upwardly within the body 12 enlarging to form a cavity 44. A shoulder 14 formed by body 12 is provided at the lowermost portion of the cavity 44 to support gland seat 20.

A plurality of packing glands 22, 24 and 26 are preferably disposed within the cavity 44 in a nested position so as to rest within the gland seat 20, as clearly shown in FIG. 1. The conical shape of the glands 22, 24 and 26 and inner seat surface 59 facilitates the stacking thereof within the seat 20 and their orientation provides an efficient pressure-enhanced seal between the rod 10 and the body 12 as will be hereinafter set forth.

Body 12 is provided with a gland cap 28 secured thereto by a plurality of bolts 30, nuts 32 and washers 36. Gland cap 28 may be provided with oil reservoir 42 if desired to provide a reservoir for oil used in the lubrication of the polished rod 10 as it reciprocates through the stuffing box 12 of the present invention. Further, gland cap 28 is provided with a gland follower 29 portion in the form of an annular metal ridge to engage the upper gland surface 31 of upper gland 26.

Due to the bore 18 being in fluid communication with cavity 44 and the wellbore, pressures within the wellbore will accordingly be transmitted into the cavity 44. Because of the relatively lower ambient pressures in reservoir 42 relative to these borehole pressures, such borehole pressures acting against the outer or lower surfaces 61, 56 and 52 of glands 22, 24 and 26 would otherwise have a tendency to move the glands vertically along axis 48 and out of cavity 44.

Thus, it will be appreciated that a purpose of gland cap 28 is to prevent substantial upward movement of the glands 22, 24 and 26 out of the cavity 44. Yet another purpose of gland cap 28 is to transmit downward pressure to glands 22, 24 and 26. Due to the matingly sliding engagement between surfaces 52 and 54, 56 and 58, and 59 and 61, such downward pressure, in addition to the borehole pressure within cavity 44, will have a tendency to effect tighter sealing between gland ridges 23, 25 and 27 and rod 10, as well as between gland shoulders 55, 51 and 53 and body wall 45. Specifically, it will be noted that as the borehole pressure within cavity 44 increases, it will increasingly force the ridges 23, 25 and 27 more radially inward and upward and will force shoulders 53, 51 and 55 radially outward, thus effecting the pressure-enhanced sealing of the present invention.

While one particular mating shape has been disclosed in FIG. 1 for gland follower 29 and upper gland surface 31, the invention admits of other shapes provided the aforementioned functions of retaining the glands 22, 24 and 26 and providing downward pressure thereon are effectively achieved.

It will be noted that although the stuffing box of the present invention is very similar to those illustrated in FIG. 3 and in U.S. Pat. Nos. 3,002,776; 3,013,831; 3,050,312; 2,994,549; 2,789,846; and 2,833,572; there are several important differences to be discussed later in more detail. In the present invention, the packing glands 22, 24 and 26 are all oriented so as to be pointing generally downward toward the wellhead rather than upward away from the wellhead as shown in the prior art. Further, the packing glands 22, 24 and 26 rest in a seat 20 whose outer diameter as well as that of the portion of gland cap 28 within cavity 44 is substantially less than the inner diameter of cavity 44. Thus, gaps 21 and 21a are provided between inner body surface 45 on the one hand, and seat 20 and gland cap 28 for purposes to be hereinafter described.

Referring now to FIG. 2, there may be seen a pictorial illustration of a typical packing gland such as gland 24. This gland 24 is preferably of an inverted frustoconical shape and has an internal bore 49 also of a frusto-conical shape for permitting the passage of the polished rod 10 therethrough. Further, the packing gland 24 may be provided with a slit 50 to facilitate the placing of the packing gland 24 about the polished rod 10. In some applications it is desirable to orient each gland when disposed in the cavity 44 so that the slits 50 thereof are not in substantial vertical alignment, as such alignment is thought to impair the sealing capability of the glands.

The packing gland 24 further may have an annular shoulder 51 for facilitating sealing contact to the inner surface of body 12 and the internal bore 49 may further form a ridge 25 for facilitating sealing contact with the polished rod 10. It will of course be appreciated that the surfaces of the glands which contact rod 10 and inner wall 45 need not be identical to those surfaces 51 and 25 of gland 24 so long as adequate sealing surface is provided.

For purposes of clarity and simplicity, when the term "downward" or "below" is utilized herein, this will be understood as a relative term to mean in the general direction along the axis 48 and toward neck 16 and conversely with respect to the term "upward" or "above", in that the stuffing box of the present invention may be oriented differently at times. Also, the base and apex of a conical frustum discussed herein will refer, respectively, to locations adjacent those portions of the frustum forming the large and small circles thereof defining the frustum. Finally, the term "inverted" when used with respect to cones or glands will refer to the orientation of such cones or glands as depicted in FIG. 1 wherein the inner and outer surfaces thereof slope generally radially inward and "downward" in a funnel-like fashion, as opposed to those of the prior art depicted in FIG. 3 in which these surfaces slope radially inward and "upward".

Whereas only the middle gland 24 has been depicted in greater detail, it will be appreciated that upper and lower glands 26 and 22 are of substantially the same conical configuration and function. Thus, gland 26 will have a shoulder 55 and ridge 27 for sealing engagement, respectively, with body surface 45 and rod 10. In like manner, gland 22 will have a shoulder 53 and ridge 23 for sealing engagement, respectively, with body surface 45 and rod 10. Moreover, when nested, as depicted in FIG. 1, outer surfaces 52, 56 and 61 of respective glands, 26, 24 and 22 will contact flush in sealing engagement, respectively, with inner surfaces 54, 58 and 59 of respective glands 24, 22, and seat 20. Still further, although, in the cross-sectional view of FIG. 1, the inner and outer surfaces of each gland are shown to be substantially parallel, it will be apparent this need not be so provided they slope generally radially downward and inward so as to matingly engage one another and nest.

The materials for and precise construction of glands 22, 24 and 26 may be selected in accordance with principles well known in the art, dependent upon the particular characteristics desired and operating situations such as expected operating temperature or pressure ranges, desired lifetime of the glands, cost, etc.

For example, "soft" or "hard" cone glands may be provided comprised of different amounts of reprocessed polymer tire cord or other polymer materials. For additional rod cleaning or lubricous characteristics, the soft cone may even desirably be comprised of approximately 20% powdered brass particles or may have wax, graphite, or Teflon ® added thereto, respectively. Thus, it is fully contemplated that the subject invention admits to variations in the composition and construction of the glands and even the gland seat, gland cap, or body without departing from the scope or spirit thereof.

For example, the glands may be comprised of any number of natural or synthetic elastomers, e.g., neoprene, butadiene acrylonitrile, fluorosilicone, fluorosulfonated polyethylene, or fluorocarbons, sold under the trademarks of "Silastic" by the Dow Chemical Company, "Hypalon" and "Viton" by the Du Pont Corporation. A particularly interesting material is a perfluoro elastomer compound sold under the trademark "Kalrez" by the Du Pont Corporation, which can simultaneously resist high temperature compression, wear and the corrosive effects of hydrogen sulfide and carbon dioxide, as well as other acids and the like.

Moreover, in some applications of the present invention wherein the inverted cones are employed, it appears beneficial to employ more than three cones, each of which further may also desirably have a smaller cone thickness relative to those of conventional non-inverted designs. It is thought that such cones may thus be more reticulative, flexible, and responsive to pressure for pressure-enhanced sealing, and may further afford more surfaces for sealing engagement with the inner wall and the rod. However, it may also be desirable in some applications to provide for even two glands, and may further be desirable to make the glands of an integral construction such as in one piece, so long as the plurality of sealing surfaces such as 23, 25, 27 and 51, 53, and 55 are provided. In like manner, referring to alternative construction and composition of the gland seat 20, although this component may be forged in a foundry operation from gray steel, for example, in many cases, it has been found desirable to fashion it from a modern engineered plastic such as polyphenylene sulfide, one commercially available example of which being known under the trademark "Ryton" available from the Phillips Chemical Company.

Similarly, the cap 28 and body 12 may also be fabricated of such materials or of a polyvinyl chloride, ultrahigh molecular weight polyethylene, or even an acrylonitrile-butadiene-styrene laminate or "ABS" material. One benefit afforded by such material, in addition to their superior strength and corrosion resistance, is the capability of forging the aforesaid components by a cold forging or casting process, thus avoiding the expensive machining and forging steps required with the prior art metallic materials.

In operation, the packing glands 22, 24 and 26 are nested one on the other and rest on the inner surface 59 of the packing seat 20. The bore of seat 20 is of sufficient size to permit the polished rod 10 to pass easily therethrough. It will be noted from FIG. 1 that upon assembly the rod 10, gland cap 28, body 12, seat 20, and glands 22, 24 and 26 will thus all be co-axially aligned with vertical axis 48.

At times, however, it has been found that rod 10 may become misaligned within the drill pipe tubing string and thus not in exact co-axial relation with the stuffing box components as aforesaid. This may, in turn, result in distortion and excessive wearing of glands 20, 22 and 24 and lead to leakage of the box or frequent re-packing of the glands 20, 22 and 24.

Figure 5:
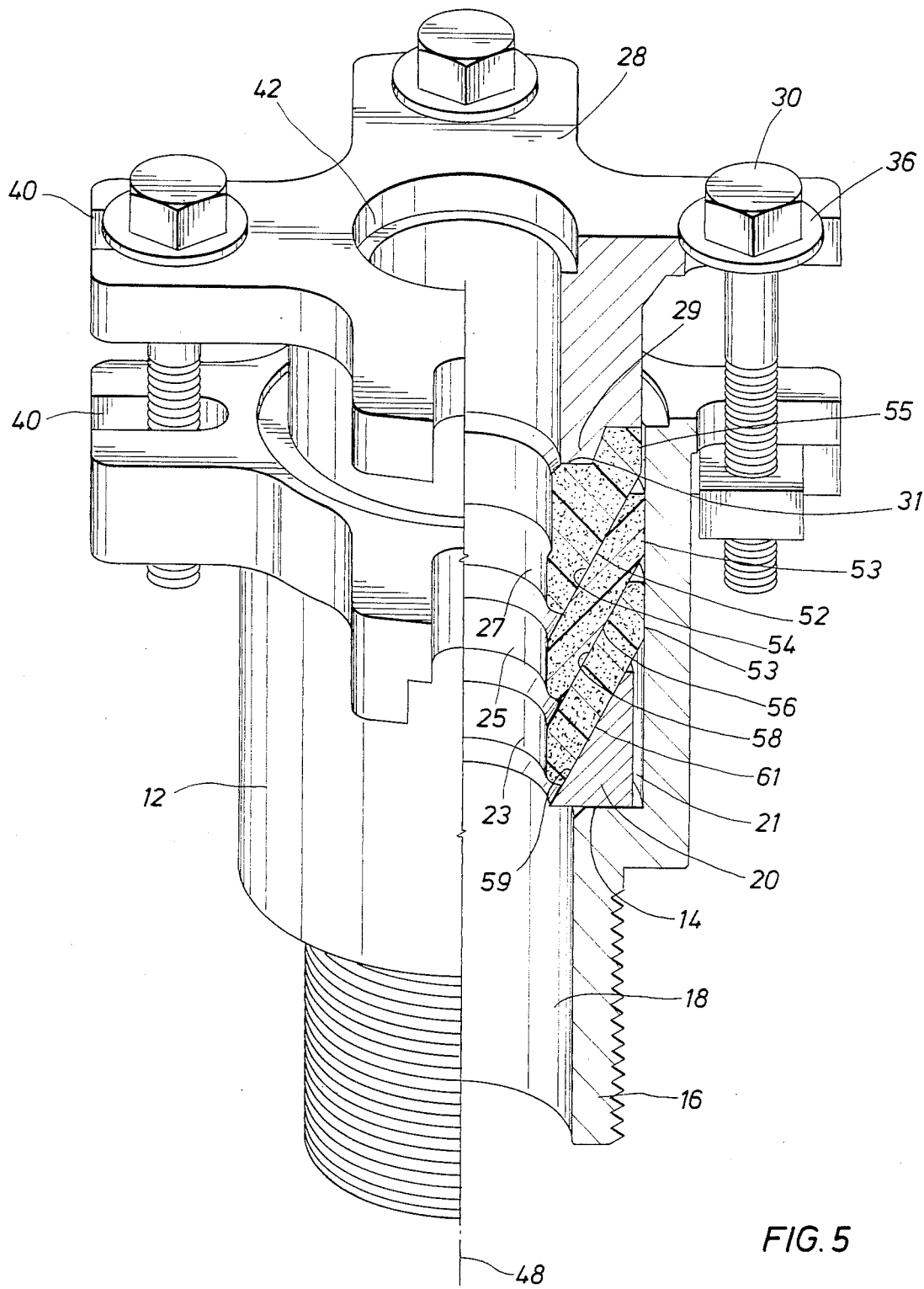
FIG. 5 is an isometric view, partially in section, of a stuffing box of the present invention.

The outer diameter of the seat 20 and that portion of the gland cap 28 within cavity 44 are preferably less than the internal diameter of the cavity 44 thus forming gaps 21 and 21a, respectively, as previously noted. Typical sizes of gaps 21 and 21a may be ⅛ inchs and 3/32 inches in width, respecitvely. This results in the seat 20 and gland cap 28 having limited horizontal or radial mobility within the cavity 44. This lateral movement permits the seat 20, cap 28 and glands 20, 22 and 24 to adjust for any such misalignment thereby reducing the hereinbefore noted distortion, wearing and re-packing of the packing glands 20, 22 and 24. Moreover, it may be seen from FIGS. 1 and 5 that slots 40 may be provided in cap 28 and body 12 so as to further faciliate radial movement in concert of the glands 20, 22 and 24, seat 21, gland cap 28 and bolts 30 relative to body 12 so as to more readily effect this self-aligning feature.

As the plurality of packing glands 20, 22 and 24 rest upon the inner surface 59 of the packing seat 20, the gland follower member 29 acts against the mating upper gland surface 31 to compress the gland followers when bolts 30 are tightened which, in turn, urge ridges 23, 25 and 27 into sealing engagement with the outer surface of polished rod 10 and urge the annular shoulders 51, 53 and 55 into sealing engagement with the inner surface 45 of cavity 44.

As previously discussed, it is a particular feature of the present invention that pressure-enhanced sealing is thus provided. Due to the inversion of the glands 22, 24 and 26 relative to those of the prior art, such as depicted in FIG. 3, it will accordingly be appreciated that borehole pressure transmitted by bore 18 into cavity 44 will tend to force ridges 23, 25 and 27 generally upward into tighter sealing engagement with the surface of rod 10. In the case of the prior art such as FIG. 3, however, it will be noted that such pressure tends to move the glands away from contact with the rod thereby reducing the effective seal.

Referring now to FIG. 3, a typical stuffing box of the prior art may be seen depicted therein for purposes of comparison to that of the present invention. In much the same manner as with FIG. 1, a stuffing box body 60 is provided which defines a cavity in which a gland seat 62 and plurality of packing glands 64, 66 and 70 are disposed. The gland seat 62 may be of a metallic material. In the alternative, a packing gland such as gland 26 of FIG. 1 having a resilient or elastomeric composition may be substituted therefor so long as it is first inverted from the orientation depicted in FIG. 1.

However, a closer comparison with FIG. 1 reveals that although the seat 62 and glands 64, 66, 68 and 70 are of a generally frusto-conical configuration, they are inverted with respect to those of FIG. 1 whereby the surfaces thereof extend in a generally upward and inward direction.

Also, in a similar manner to FIG. 1, an outer gland cap 72 is provided having a plurality of bolts 74 and nuts 76 interconnecting the cap 72 and the body 60, whereby when they are tightened, the outer gland follower 78 exerts downward pressure on the glands 64, 66, 68 and 70, in a manner so as to force the outer edges thereof into sealing engagement with the inner surface of the body 60.

Yet another difference from FIG. 1 is readily apparent in FIG. 3, namely provision of an additional inner gland cap 80 portion of the upper stuffing box body 82 having an inner gland follower 79 contacting the uppermost inner edge of the upper gland 70.

In like manner to outer gland cap 72, the inner gland cap 80 is also provided with a plurality of bolts 84 and nuts 86 integrally connecting the upper and lower bodies 82 and 60, respectively, whereby tightening of the bolts 84 results in downward pressure being exerted by the gland follower 79 of the inner gland cap 80 against the upper gland 70. This pressure is transmitted through all glands 64, 66, 68 and 70, thereby effecting sealing against the outer surface of polished rod 88.

As aforementioned, several serious problems are associated with such a typical design of the prior art. Among these are that upward borehole pressure in the interstices of body 60 will tend to move the glands 64, 66, 68 and 70 away from the rod 88, destroying the sealing effect.

Moreover, for proper sealing, it is necessary to insure that both sets of bolts 74 and 84 are torqued relative to one another to within a proper tolerance range. Yet another problem with conventional designs such as that of FIG. 3 is that the inner gland follower 79, due to the tremendous upward pressure exerted by the upper packing gland 70 must be machined to precise tolerances in order to mate properly with gland 70 and thus effect proper downward pressure without damaging the gland 70.

It will further be noted from FIG. 3 that no provision is made for slots in the gland caps 72 and 80 which receive bolts 74 and 84, nor is a gap such as gap 21 of FIG. 1 provided. Thus, any misalignment of rod 88 relative to the stuffing box assembly of FIG. 3 results in excessive wear on the glands 64, 66, 68 and 70.

Still further, review of FIG. 3 will reveal that in order to effect proper sealing, extra glands are often necessary such that four are depicted therein. This, in turn, results in the aforementioned problems associated with correlative increase in size of the overall stuffing box. Moreover, due to the extra material required from which the glands are fashioned, more expensive corrosion-resistant materials cannot be economically employed. This results in leakage and low lifetime problems associated with corroding glands made of less expensive and thus less resistant materials.

Reference will now be made to FIG. 4 where there may be seen depicted therein an alternate embodiment of the present invention which adapts the novel inverted packing feature thereof to a "double-packed" stuffing box. Description of a typical double-packed box of the prior art may be found, e.g., in U.S. Pat. No. 2,833,572 to Moseley.

It is sometimes desirable to provide two separate and distinct sets of sealing means for applications wherein higher pressures and intermittent flow are anticipated. In this manner, one sealing means can maintain the seal temporarily while the glands of the other seal are replaced.

Thus, with reference to FIG. 4 in more detail, it will be noted that the inverted-cone concept of the present invention depicted in FIG. 1 may be beneficially adapted to such a double-packed stuffing box embodiment. More particularly, it will be recognized that, in like manner to the embodiment of FIG. 1, a stuffing box body 92 may be provided forming a cavity 124 and a shoulder 94 which carries the familiar gland seat 100, typically of a metallic construction, and packing glands 102, 104 and 106.

However, as in the case of the embodiment depicted in FIG. 3, the gland seat 100 may have substituted therefor a packing gland such as gland 106 provided the gland 106 is first inverted from the orientation depicted in FIG. 4.

Also, in like manner to FIG. 1, a gland cap 108 is provided interconnected to the upper body 92 by bolts 110, washers 116, and nuts 112. The gland follower 109 of gland cap 108 thus exerts sealing pressure on the upper gland 106 upon tightening of the bolts 110, thus effecting sealing engagement between rod 90 and glands 102, 104 and 106.

Additional similarities to FIG. 1 include provision of the oil reservoir 122, slots 120 in gland follower 108 and a gap 101 formed due to the outer diameter of seat 100 being smaller than the inner diameter of body 92, all for purposes hereinbefore described.

Still referring to FIG. 4, differences will be noted from the embodiment of FIG. 1 relative to the addition of an extra sealing means for purposes just described. More particularly, the upper body 92 is provided with packing nuts 136 and compression bolts 138 whereby when the bolts are tightened they press downwardly against a lower gland cap 134 disposed within a cavity formed by the lower body 126 and upper body 92. The bodies 126 and 92 may be conveniently held together by means of bolts 128.

The lower body 126 also has a shoulder 94 portion which carries a seat 100 upon which are nested packing glands 130 and 132. In like manner to FIG. 3, the downward pressure of the gland follower 135 on glands 130 and 132 will effect sealing engagement thereof against the inner wall of body 126 and rod 90.

When it is desired to service or repack upper glands 102, 104 or 106, compression bolts 138 may be tightened to cause sealing of glands 130 and 132. Upper gland cap 108 is thence removed to gain access to glands 102, 104 and 106 by removal of bolts 110. The process is then reversed after such servicing or repacking, whereby the primary sealing is again effected by the upper glands 102, 104 and 106 in accordance with the teachings of the present invention.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

What is claimed is:

1. For use in a petroleum well having a reciprocating polished rod with a central axis therethrough, a stuffing box disposable about said rod and in coaxial alignment therewith, said box comprising:

a body having
  a cylindrical inner wall;
  a shoulder perpendicular to said wall;
  said wall and said shoulder defining a cavity in said body; and
  a threaded neck having an internal bore therethrough in fluid communication with said cavity;
a gland seat disposed within said cavity and carried by said shoulder having
  an internal surface formed by a bore passing through said seat and defining a conical frustum having
    a base and an apex lying, respectively, above and below a plane perpendicular to said axis and intersecting said seat;
a lower, a middle, and an upper inverted cone packing bland each disposed within said cavity and having
  an outer surface including a shoulder for sealingly engaging said inner wall of said body; and an inner surface formed by a bore passing through said gland and including a ridge for sealingly engaging said rod;

a portion of said outer and inner surfaces of said lower gland being in mating engagement with a portion of said internal surface of said seat, and said outer surface of said middle gland, respectively; and a portion of said inner surface of said middle gland matingly engaging said outer surface of said upper gland;

a portion of said upper gland further including an upper gland surface having a portion defining at least one ring-shaped surface lying in at least one plane perpendicular to said axis;

a gland cap having an oil reservoir formed by a bore passing through said gland cap; and a gland follower member disposed within said cavity and matingly engaging said ring-shaped surface of said upper gland surface; and a plurality of fasteners interconnecting said gland cap and said body; and said bores of said neck, gland seat, lower, middle, and upper glands, and gland cap being in coaxial alignment with said central axis and adapted to receive said rod.

2. The apparatus of claim 1, wherein said gland seat includes:

an outer surface having an outer diameter perpendicular to said axis; and wherein said inner wall has an inner diameter perpendicular to said axis greater than said outer diameter, to permit radial movement of said seat within said cavity and along said shoulder in an amount sufficient to compensate for misalignment of said rod relative to said stuffing box.

3. The apparatus of claim 2, wherein a portion of said gland cap disposed within said cavity has an outer diameter perpendicular to said axis less than said inner diameter of said inner wall, and wherein said body and said gland cap, in combination, define a plurality of pairs of slots, spaced radially about said axis, each said pair being comprised of:

a slot in said body; and a slot in said gland cap in coaxial vertical alignment with said slot in said body along an axis parallel to said central axis; and wherein one of said plurality of fasteners is disposed in each of said pairs of slots in coaxial alignment therewith, whereby said gland cap may be adjustably displaced in a direction perpendicular to said central axis relative to said body when said plurality of said fasteners are disposed within said pairs of slots.

4. The apparatus of claim 1, wherein said outer surface of each of said lower, middle, and upper glands defines a conical frustum having a base and an apex below said base.

5. The apparatus of claim 4, wherein said inner surface of each of said lower, middle, and upper glands defines a conical frustum having a base and an apex below said base.

6. The apparatus of claim 5, wherein each of said plurality of fasteners includes means for urging said gland cap downwards along said central axis.

7. The apparatus of claim 1, wherein said upper gland surface includes:

a first portion lying substantially in a first plane perpendicular to said axis; and a second portion lying substantially in a second plane perpendicular to said axis and above said first plane.

8. The apparatus of claim 7, wherein said upper gland surface further includes:

a third portion defining a ring about said axis intersecting said first and second portions of said upper gland surface.

9. The apparatus of claim 8, wherein said ridge of said inner surface of said upper gland intersects said first plate and wherein said gland follower member engages substantially all of said upper gland surface.

10. The apparatus of claim 9, wherein said gland cap is urged downwards in an amount sufficient to effect said sealing engagement of said shoulders of said packing glands with said inner wall and said ridge of said packing glands with said rod.

11. A stuffing box for use with a polished rod reciprocally disposable therethrough along a central axis, comprising:

a body having an inner wall defining a cavity;

a neck having a bore therethrough in fluid communication with said cavity;

a shoulder interconnecting said body and said neck;

inverted gland sealing means disposed in said cavity for sealing between said rod and said inner wall;

sealing seat means carried by said shoulder for supporting said sealing means, said sealing means having an upper surface including a first ring-shaped surface lying in a first plane normal to said axis; and a second ring-shaped surface lying in a second plane normal to said axis and between said first plane and said shoulder; and means for exerting a downward force against said sealing means having a lower surface conforming to said upper surface of said sealing means.

12. The apparatus of claim 11, wherein said sealing means is a plurality of inverted cone glands.

13. The apparatus of claim 12, wherein said means for exerting downward force comprises:

a gland cap means having a gland follower surface in contact with said sealing means; and a fastener means interconnecting said gland cap means and said body for urging said gland follower surface and said shoulder along said central axis toward each other.

14. The apparatus of claim 13, wherein said fastener means includes:

means for adjusting the amount of said downward force exerted against said sealing means.

15. The apparatus of claim 14, wherein said plurality of glands comprises:

a lower, a middle, and an upper gland.

16. The apparatus of claim 15, wherein each of said glands includes:

an outer surface having a portion sealingly engageable with said wall and defining generally a frustoconical shape, said outer surfaces sloping radially inward and downward relative to said axis; and an inner surface having a portion sealingly engageable with said rod.

17. The apparatus of claim 16, wherein said inner surface of said lower and middle glands each define generally a frusto-conical shape, said inner surfaces of said lower and middle glands sloping generally radially inward and downward relative to said axis.

18. A stuffing box for use with a polished rod reciprocally disposable therethrough along a central axis, comprising:
   a body having an inner wall defining a cavity;
   a neck having a bore therethrough in fluid communication with said cavity;
   a shoulder interconnecting said body and said neck;
   a lower, middle, and upper inverted cone sealing gland disposed in said cavity for sealing between said rod and said inner wall, each said gland including
      an outer surface having a portion sealing engagable with said wall and defining generally a frusto-conical shape, said outer surfaces sloping radially inward and downward relative to said axis; and
      an inner surface having a portion sealingly engagable with said rod,
         said inner surface of said lower and middle glands each defining generally a frusto-conical shape, and said inner surfaces of said lower and middle glands sloping generally radially inward and downward relative to said axis;
         said inner and outer surfaces of said lower and middle glands and said outer surface of said upper gland being substantially parallel;
         said portion of said inner surface of said upper gland which is sealingly engageable with said rod being greater than said portion of said inner surface of said lower or middle gland which is sealingly engagable with said rod;
   sealing seat means carried by said shoulder for supporting said sealing means; and
   gland cap means having
      a gland follower surface in contact with said sealing means; and
      a fastener means interconnecting said gland cap means and said body for urging said gland follower surface and said shoulder along said central axis toward each other, said fastener means including; and
   means for adjusting the amount of downward force exerted against said sealing means by said gland cap means.

19. The apparatus of claim 18 wherein said sealing seat means comprises:
   ring-like member having an inner surface defining a bore therethrough for receiving said rod, said inner surface of said member being substantially parallel to said outer surface of said inverted cone glands and in mating engagement with one of said outer surfaces.

20. The apparatus of claim 19, wherein said body, neck, shoulder, said sealing glands and said gland cap means are coaxially aligned about said rod and said central axis; and wherein a portion of said outer surface of at least one of said glands is in mating engagement with and above a portion of said inner surface of at least one other of said glands.

21. In a stuffing box disposable about a reciprocating polished rod and having an inner wall defining a cavity and a neck defining a bore for communicating borehole pressure from said bore to said cavity, improved means for isolating a portion of said cavity from said borehole pressure, comprising:
   at least one cone inverted so as to define an outer surface with a diameter which when installed in said box intersects said rod and decreases as a function of movement of said diameter along said rod towards said neck, said inverted cone having at least one upper surface area defining a ring-shaped surface lying in a plane perpendicular to said bore;
   said box and said rod being coaxially aligned along a central axis; and wherein said inverted cone includes:
      a circular shoulder surface disposed about said axis in sealing engagement with said inner wall; and
      a circular ridge surface disposed about said axis below said shoulder surface and sealably engageable with said rod.

22. The apparatus of claim 21, wherein said at least one inverted cone has:
   an inner surface defining a bore through said cone adapted to receive said rod;
   said outer surface including said shoulder surface; and
   said inner surface including said ridge surface.

23. The apparatus of claim 22, wherein said outer surface defines a conical frustum having a base and having an apex below said base.

24. The apparatus of claim 23 wherein said bore defines a second conical frustum having a base and having an apex below said base.

25. The apparatus of claim 24, wherein said at least one inverted cone is comprised of a perfluoroelastomer compound.

26. The apparatus of claim 25, wherein said at least one inverted cone comprises:
   a lower cone;
   a middle cone carried by and disposed above and partially within said lower cone; and
   an upper cone carried by and disposed above and partially within said middle cone.

27. In a stuffing box for use in a petroleum well adapted to receive a reciprocating polished rod therethrough including a stuffing box body having a cylindrical inner wall having an internal diameter, a shoulder perpendicular to said wall, said wall and said shoulder defining a cavity in said body, a threaded neck having a bore therethrough in fluid communication with said cavity, a gland seat disposed within said cavity and carried by said shoulder having an inner surface defining a bore therethrough, a gland cap having an oil reservoir formed by a bore passing through said gland cap, a plurality of fastener means for interconnecting said gland cap and said body, and a plurality of packing gland means carried by said gland seat and disposed within said cavity and having bores therethrough for effecting a fluid-tight seal in said cavity between said oil reservoir and said bore of said neck by sealing engagement with said inner wall and said rod, said rod having a central axis therethrough and said cavity and said bores of said neck, gland seat, gland cap, and plurality of packing gland means being adapted to receive said rod in coaxial alignment therewith;
   an improved gland seat comprising:
      an inner surface disposable about said axis and forming said bore through said seat, said inner surface further defining generally a conical frustum; and
      a lower surface defining a plane normal to said central axis.

28. The apparatus of claim 27, wherein said conical frustum includes a base and an apex, and wherein said base is located above said apex.

29. The apparatus of claim 28, wherein said improved gland seat includes:

an outer surface having an outer diameter perpendicular to said central axis and smaller than said outer diameter of said gland seat so as to permit radial movement of said seat along said shoulder perpendicular to said axis in an amount sufficient to compensate for misalignment of said rod relative to said stuffing box.

* * * * *

REEXAMINATION CERTIFICATE (1993rd)

United States Patent [19]

Hoff

[11] B1 4,560,176

[45] Certificate Issued  May 4, 1993

[54] INVERTED CONE STUFFING BOX

[75] Inventor: H. Milton Hoff, Borger, Tex.

[73] Assignee: J. M. Huber Corporation, Lucust, N.J.

Reexamination Request:
No. 90/002,646, Feb. 14, 1992

Reexamination Certificate for:
Patent No.: 4,560,176
Issued: Dec. 24, 1985
Appl. No.: 517,484
Filed: Jul. 26, 1983

[51] Int. Cl.$^5$ .............................................. F16J 15/24
[52] U.S. Cl. ................................... 277/105; 277/115; 277/118; 277/124
[58] Field of Search ............... 277/105, 106, 115, 116, 277/116.2, 117-125, 102, 30, 97-100

[56] References Cited

U.S. PATENT DOCUMENTS

| Number | Date | Name | Class |
|---|---|---|---|
| 196,119 | 10/1877 | Holt . | |
| 226,558 | 4/1880 | Shearer . | |
| 396,120 | 1/1889 | St. John . | |
| 464,331 | 12/1891 | Monroe | 277/97 X |
| 494,817 | 4/1893 | Long | 277/100 X |
| 637,093 | 11/1899 | Endruweit . | |
| 654,706 | 7/1900 | Braymer . | |
| 712,512 | 11/1902 | Elliott | 277/116 |
| 844,525 | 2/1907 | Lee | 277/124 |
| 1,044,787 | 11/1912 | Klingloff | 277/124 X |
| 1,363,565 | 12/1920 | Christenson . | |
| 1,627,945 | 5/1927 | Wigle . | |
| 1,736,646 | 11/1929 | Brammer . | |
| 1,845,683 | 2/1932 | Saunders . | |
| 1,964,237 | 6/1934 | Wheeler . | |
| 1,989,903 | 2/1935 | Wheeler . | |
| 1,991,715 | 2/1935 | Wheeler . | |
| 1,996,779 | 4/1935 | Wheeler . | |
| 2,006,529 | 7/1935 | Wheeler . | |
| 2,026,409 | 12/1935 | Wheeler . | |
| 2,028,961 | 1/1936 | Wheeler . | |
| 2,056,687 | 10/1936 | Moseley . | |
| 2,075,899 | 4/1937 | Humason . | |
| 2,126,366 | 8/1938 | Boyer | 277/105 X |
| 2,132,814 | 10/1938 | Wheeler . | |
| 2,151,356 | 3/1939 | Queen . | |
| 2,179,814 | 11/1939 | Conaghan . | |
| 2,181,748 | 11/1939 | Thaheld . | |
| 2,278,347 | 3/1942 | Copp | 277/124 |
| 2,286,300 | 6/1942 | Outcalt . | |
| 2,442,687 | 6/1948 | Heathcott . | |
| 2,480,055 | 8/1949 | Seaton . | |
| 2,544,212 | 3/1951 | Bayless et al. . | |
| 2,573,832 | 11/1951 | Callahan | 277/105 X |
| 2,600,848 | 6/1952 | Collins et al. . | |
| 2,634,145 | 4/1953 | Monahan . | |
| 2,711,333 | 6/1955 | Rodgers . | |
| 2,765,185 | 10/1956 | Mott | 277/124 |
| 2,789,846 | 4/1957 | Moseley . | |
| 2,806,721 | 9/1957 | Fagg et al. . | |
| 2,808,229 | 10/1957 | Bauer et al. . | |
| 2,819,102 | 1/1958 | Horvath . | |
| 2,833,572 | 5/1958 | Moseley . | |
| 2,994,549 | 8/1961 | Tschappat . | |
| 3,002,776 | 10/1961 | Tschappat | 277/235 R |
| 3,013,830 | 12/1961 | Milligan | 277/124 X |
| 3,013,831 | 12/1961 | Tschappat . | |
| 3,050,312 | 8/1962 | Tschappat | 277/208 |
| 3,084,946 | 4/1963 | Sharp | 277/124 X |
| 3,128,614 | 4/1964 | Auer . | |
| 3,145,995 | 8/1964 | Adamson et al. . | |
| 3,163,430 | 12/1964 | Normand . | |
| 3,351,350 | 11/1967 | Shepler | 277/124 X |
| 3,419,280 | 12/1968 | Wheeler . | |
| 3,486,759 | 12/1969 | Lewis . | |
| 3,586,341 | 6/1971 | Whittaker . | |
| 3,790,179 | 2/1974 | Scannell . | |
| 3,868,832 | 3/1975 | Biffle . | |
| 3,967,678 | 7/1976 | Blackwell . | |
| 4,192,517 | 3/1980 | Torres | 277/118 X |
| 4,234,197 | 11/1980 | Amancharla et al. | 277/125 X |
| 4,281,840 | 8/1981 | Harris . | |
| 4,312,404 | 1/1982 | Morrow . | |
| 4,363,357 | 12/1982 | Hunter . | |
| 4,406,469 | 9/1983 | Allison | 277/123 |
| 4,444,250 | 4/1984 | Keithahn et al. . | |
| 4,444,401 | 4/1984 | Roche et al. . | |
| 4,448,255 | 5/1984 | Shaffer et al. . | |

FOREIGN PATENT DOCUMENTS 2412698  9/1975  Fed. Rep. of Germany ...... 277/124

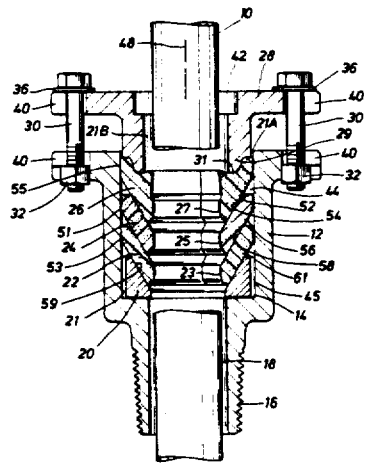

402081  1/1912  France ............................. 277/117

*Primary Examiner*—William A. Cuchlinski, Jr.

[57] ABSTRACT

A stuffing box for use in oil and gas wells having improved sealing. A plurality of ring-like packing glands each has an outer surface defining an inverted frusto-conical shape and a bore therethrough also defining an internal inverted frusto-conical surface whereby the glands nest upon one another in cup-like fashion. A ring-like seal seat also has a bore forming an inverted frusto-conical inner surface which, in assembly, carries the nested glands. The inner wall of a stuffing box body defines a cavity which contains the assembly, the seat thereof being carried by a lower shoulder portion defined by the body. A cylindrical gland cap has a lower gland follower edge portion which exerts downward pressure on the end of the uppermost gland. The vertical bore through the body, seat, glands, and gland cap is adapted to receive a vertical reciprocating polished rod in coaxial alignment therewith whereby the downward pressure of the gland follower effects sealing of the inner and outer surfaces of the glands to the rod and to the inner wall of the body, respectively. Sealing is pressure-enhanced by borehole pressure, and any misalignment of the rod is compensated for by providing for horizontal movement of the seat, glands, and gland cap relative to the box.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, lines 49–68 to Column 8, lines 1–14:

At times, however, it has been found that rod 10 may become misaligned within the drill pipe tubing string and thus not in exact co-axial relation with the stuffing box components as aforesaid. This may, in turn, result in distortion and excessive wearing of glands [20, 22 and 24] *22, 24 and 26* and lead to leakage of the box or frequent re-packing of the glands [20, 22 and 24] *22, 24 and 26.*

The outer diameter of the seat 20 and that portion of the gland cap 28 within cavity 44 are preferably less than the internal diameter of the cavity 44 thus forming gaps 21 and 21a, respectively, as previously noted. Typical sizes of gaps 21 and 21a may be ⅛ inches and 3/32 inches in width, respectively. This results in the seat 20 and gland cap 28 having limited horizontal or radial mobility within the cavity 44. This lateral movement permits the seat 20, cap 28 and glands [20, 22 and 24] *22, 24 and 26* to adjust for any such misalignment thereby reducing the hereinbefore noted distortion, wearing and re-packing of the packing glands [20, 22 and 24] *22, 24 and 26.* Moreover, it may be seen from FIGS. 1 and 5 that slots 40 may be provided in cap 28 and body 12 so as to further faciliate radial movement in concert of the glands 20, 22 and 24, seat 21, gland cap 28 and bolts 30 relative to body 12 so as to more readily effect this self-aligning feature.

As the plurality of packing glands [20, 22 and 24] *22, 24 and 26* rest upon the inner surface 59 of the packing seat 20, the gland follower member 29 acts against the mating upper gland surface 31 to compress the gland followers when bolts 30 are tightened which, in turn, urge ridges 23, 25 and 27 into sealing engagement with the outer surface of polished rod 10 and urge the annular shoulders 51, 53 and 55 into sealing engagement with the inner surface 45 of cavity 44.

Column 8, lines 26–36:

Referring now to FIG. 3, a typical stuffing box of the prior art may be seen depicted therein for purposes of comparison to that of the present invention. In much the same manner as with FIG. 1, a stuffing box body 60 is provided which defines a cavity in which a gland seat 62 and plurality of packing glands 64, 66, *68* and 70 are disposed. The gland seat 62 may be of a metallic material. In the alternative, a packing gland such as gland 26 of FIG. 1 having a resilient or elastomeric composition may be substituted therefor so long as it is first inverted from the orientation depicted in FIG. 1.

Column 9, lines 54–58:

However, [as in the case of the embodiment depicted in] *to obtain a prior art double-packed stuffing box similar to* FIG. 3, the gland seat 100 may have substituted therefore a packing gland such as gland 106 provided the gland 106 is first inverted from the orientation depicted in FIG. 4.

Column 10, lines 13–18:

The lower body 126 also has a shoulder 94 portion-which carries a seat [100] *140* upon which are nested packing glands 130 and 132. In like manner to FIG 3, the downward pressure of the gland follower 135 on glands 130 and 132 will effect sealing engagement thereof against the inner wall of body 126 and rod 90.

AS A RESULT OF REEXAMINATION, IT HAS BEEN DETERMINED THAT:

The patentability of claim 18 is confirmed.

Claims 15–17 and 21–29 are cancelled.

Claims 1, 2, 9, 11–14 and 19 are determined to be patentable as amended.

Claims 3–8, 10 and 20, dependent on an amended claim, are determined to be patentable.

New claims 30–38 are added and determined to be patentable.

1. For use in a petroleum well having a reciprocating polished rod with a central axis therethrough, a stuffing box disposable about said rod and in coaxial alignment-therewith, said box comprising:
  a body having
    a cylindrical inner wall;
    a shoulder perpendicular to said wall;
    said wall and said shoulder defining a cavity in said body; and
    a threaded neck having an internal bore therethrough in fluid communication with said cavity;
  a gland seat disposed within said cavity and carried by said shoulder having
    an internal surface formed by a bore passing through said seat and defining a conical frustum having
      a base and an apex lying, respectively, above and below a plane perpendicular to said axis and intersecting said seat;
  a lower, a middle, and an upper inverted cone packing [bland] *gland* each disposed within said cavity and having
    an outer surface including a shoulder for sealingly engaging said inner wall of said body; and
    an inner surface formed by a bore passing through said gland and including a ridge for sealingly engaging said rod;
    a portion of said outer and inner surfaces of said lower gland being in mating engagement with a portion of said internal surface of said seat, and said outer surface of said middle gland, respectively; and
    a portion of said inner surface of said middle gland matingly engaging said outer surface of said upper gland;
    a portion of said upper gland further including an upper gland surface having a portion defining at least one ring-shaped surface lying in at least one plane perpendicular to said axis;

a gland cap having
an oil reservoir formed by a bore passing through said gland cap; and
a gland follower member dispoded within said cavity and matingly engaging said ring-shaped surface of said upper gland surface; and a plurality of fasteners interconnecting said gland cap and said body; and said bores of said neck, gland seat, lower, middle, and upper glands, and gland cap being in coaxial alignment with said central axis and adapted to receive said rod.

2. The apparatus of claim 1, [wherein said gland seat includes:] *further comprising:*
*said gland seat includes* an outer *circular* surface having an outer diameter perpendicular to said axis; and
[wherein] said *cylindrical* inner wall *of said body* has an inner diameter perpendicular to said axis *and* greater than said outer diameter[,] to permit radial movement of said seat within said cavity and along said shoulder in an amount sufficient to compensate for misalignment of said rod relative to said stuffing box.

9. The apparatus of claim 8, wherein said ridge of said inner surface of said upper gland intersects said first [plate] *portion* and wherein said gland follower member engages substantially all of said upper gland surface.

11. A stuffing box for use with a polished rod reciprocally disposable therethrough along a central axis, comprising:
a body having an inner wall defining a cavity;
a neck having a bore therethrough in fluid communication with said cavity;
a shoulder interconnecting said body and said neck;
*a plurality of* inverted *cone* gland sealing means disposed in said cavity for sealing between said rod and said inner wall, *one or more of said gland sealing means including an outer surface sealingly engaging said inner cavity wall and defining a generally frustroconical shape, said outer surface sloping generally inward and downward relative to said central axis, one or more of said gland sealing means further including an inner surface sealingly engaging said rod, said inner surface defining a generally frustroconical shape, each inner surface sloping generally inward and downward relative to said central axis, said inner surface and said outer surface being in planar nested engagement;*
sealing seat means carried by said shoulder for supporting said *gland* sealing means, said sealing *seat* means having an upper surface including
a first ring-shaped surface lying in a first plane normal to said axis; and
a second ring-shaped surface lying in a second plane normal to said axis and between said first plane and said shoulder; and
means for exerting a downward force against said *gland* sealing means having a lower surface conforming to said upper surface of said *gland* sealing means.

12. The apparatus of claim 11, wherein said *gland* sealing means is [a plurality of] *at least three* inverted cone glands *having at least two outer surfaces, and at least two inner surfaces in planar nested engagement with said outer surfaces.*

13. The apparatus of claim 12, wherein said means for exerting downward force comprises:
a gland cap means having a gland follower surface in contact with said *gland* sealing means; and
a fastener mean interconnecting said gland cap means and said body for urging said gland follower surface and said shoulder along said central axis toward each other.

14. The apparatus of claim 13, wherein said fastener means includes:
means for adjusting the amount of said downward force exerted against said *gland* sealing means.

19. The apparatus of claim 18 wherein said sealing seat means comprises:
*a* ring-like member having an inner surface defining a bore therethrough for receiving said rod, said inner surface of said member being substantially parallel to said outer surface of said inverted cone glands and in mating engagement with one of said outer surfaces.

*30. The apparatus of claim 1, wherein said plurality of fasteners interconnecting said gland cap and said body comprise threads axially fixed with respect to said gland cap and mating threads axially fixed with respect to said body.*

*31. The apparatus of claim 11, wherein said sealing seat means has an outer cylindrical surface having a seat diameter less than a cavity diameter of said inner wall of said stuffing box body, thereby forming a gap between said outer cylindrical surface and said inner wall to permit radial movement of said sealing seat means along said stuffing box shoulder.*

*32. The apparatus of claim 31, wherein said sealing seat means has an inner surface disposed about said central axis and forming a bore through said sealing seat means, said inner surface extending from said outer cylindrical surface to said bore and defining generally a conical frustrum having a base and an apex located below said base, said inner surface being in planar engagement with said sealing means.*

*33. The apparatus of claim 11, wherein said sealing seat means has an internal surface defining a conical frustrum having a base and an apex below said base, said internal surface being in planar engagement with said sealing means.*

*34. The apparatus of claim 33, wherein said sealing seat means has a lower surface defined by a plane perpendicular to said central axis.*

*35. The apparatus of claim 11, wherein said sealing seat means has a lower surface defining a plane normal to said central axis for planar engagement with said stuffing box shoulder.*

*36. The apparatus of claim 11, wherein said gland sealing means has a lower surface in planar engagement with said sealing seat means.*

*37. The apparatus of claim 11, further comprising:*
*a gland cap having an oil reservoir formed by a bore passing through said gland cap; and*
*said neck has external threads for connection to a well head.*

*38. The apparatus of claim 37, wherein said means for exerting said downward force comprises a gland follower member including thereon the lower surface conforming to the upper surface of said sealing means.*

* * * * *